INVENTOR
JAMES H. JEFFERY, JR.

BY  Shapiro and Shapiro
ATTORNEYS

Dec. 23, 1969         J. H. JEFFERY, JR         3,484,964
CENTER STEERING FOUR-WHEEL DRIVE VEHICLE
Filed Sept. 16, 1966                      4 Sheets-Sheet 3

INVENTOR
JAMES H. JEFFERY, JR.

BY  *Shapiro and Shapiro*

ATTORNEYS

Dec. 23, 1969　　　J. H. JEFFERY, JR　　　3,484,964
CENTER STEERING FOUR-WHEEL DRIVE VEHICLE
Filed Sept. 16, 1966　　　　　　　　　　　　　　　4 Sheets-Sheet 4

INVENTOR
JAMES H. JEFFERY, JR.

BY　Shapiro and Shapiro

ATTORNEYS

United States Patent Office 3,484,964
Patented Dec. 23, 1969

3,484,964
CENTER STEERING FOUR-WHEEL DRIVE VEHICLE
James H. Jeffery, Jr., 15107 Fairlawn Ave., Silver Spring, Md. 20904
Filed Sept. 16, 1966, Ser. No. 580,010
Int. Cl. E02f 3/76; B60k 3/00; B66b 9/20
U.S. Cl. 37—117.5                    15 Claims

ABSTRACT OF THE DISCLOSURE

Four-wheel drive vehicle in which a forward frame is interconnected with a rearward frame for center steering and for tilting of one frame relative to the other about a roll axis. This forward frame supports a fork-lift having a mast connected to the rear frame such that upward forces on the steering joint due to the load are counterbalanced. An internal combustion engine drives a variable displacement pump connected in a closed hydraulic circuit with a pair of hydraulic motors, one of which drives the front axle and the other of which drives the rear axle.

---

This invention relates to a material moving vehicle and more particularly to an improved hydraulically driven vehicle.

In prior load-moving vehicles, such as work-lift trucks, it has been proposed to provide a steering joint between the front and rear axles, so that a forward frame may be turned relative to a rear frame of the vehicle to permit short-radius turns in which the rear wheels track the front wheels. When the load projects forwardly of the front axle, a strong torque tends to tilt the forward frame about the axis of the front axle and to move the back of the forward frame upwardly. To accommodate the applied stresses an unusually large and expensive steering joint is necessary.

An important concept of the present invention resides in the discovery that the problems of stress and wear at the stteering join can be substantially alleviated by proper connection of the load-supporting means, such as a fork-lift mast, to the rear frame, so as to compensate for the torque created at the steering joint.

It has also been proposed to provide a center steering vehicle with means for permitting the forward frame to tilt relative to the rear frame about the longitudinal axis of the vehicle in order to accommodate uneven ground. It is an object of the present invention to provide such a vehicle with an unusually wide range of articulation, while permitting unimpaired tilting of a load-supporting mast, and without requiring complicated joints and drive trains.

For moving heavy loads four-wheel drive vehicles have bene proposed, but such vehicles, particularly where center steering is employed, have had complicated drive trains. To avoid the complexities of mechanical drive shafts in center steering vehicles it has even been proposed to utilize a pair of internal combustion engines, one supported upon and driving the front axle, the other supported upon and driving the rear axle. Hydraulic drive arrangements have been proposed, such as those employing a separate hydraulic motor for each wheel, but such systems have been unduly complex and expensive.

It is accordingly an object of the invention to provide a four-wheel drive vehicle, and particularly a center steering vehicle, with a simple yet highly versatile hydraulic drive system requiring only two hydraulic motors, one hydraulic pump, and a single engine for driving the pump.

Yet another object of the invention is to provide a four-wheel drive vehicle in which variable speed forward and reverse movement and braking are provided in a simple manner by the hydraulic system itself.

Still another object of the invention is to provide a vehicle of the foregoing type capable of rapid movement over roads and of precisely controlled slow movement under heavy loads without stalling.

A further object of the invention is to provide a vehicle of the foregoing type which is capable of high torque, with the amount of torque at the respective axles being variable to suit existing conditions.

An additional object of the invention is to provide a vehicle of the foregoing type in which the engine and most of the drive train components and the controls are supported over one axle (along with an earth moving blade which conveniently serves as a counter-balance) and in which the primary load engaging means is supported over the other axle.

A broader object of the invention is to provide an improved center steering four-wheel drive vehicle of unusual simplicity, economy, versatility, and reliability.

Briefly stated, a preferred form of vehicle constructed in accordance with the invention has a forward frame supported upon a front axles and a rear frame supported upon a rear axle, the frames being interconnected for center steering and for tilting of one frame relative to the other. The forward frame supports a fork-lift having a mast connected to the rear frame such that upward forces on the steering joint due to the load are counterbalanced. The rear frame supports an internal combustion engine, a drive's station with suitable controls, and an earth-moving blade. The internal combustion engine drives a variable displacement pump connected in a closed hydraulic circuit with a pair of hydraulic motors, one of which is mounted upon the forward frame and drives the front axle and the other of which is mounted upon the rear frame and drives the rear axle.

The foregoing and other objects, advantages, and features of the invention will become more readily apparent upon consideration of the following detailed description of the invention taken in conjunction with the accompany drawings, which illustrate a preferred and exemplary embodiment, and wherein.

Figure 1:
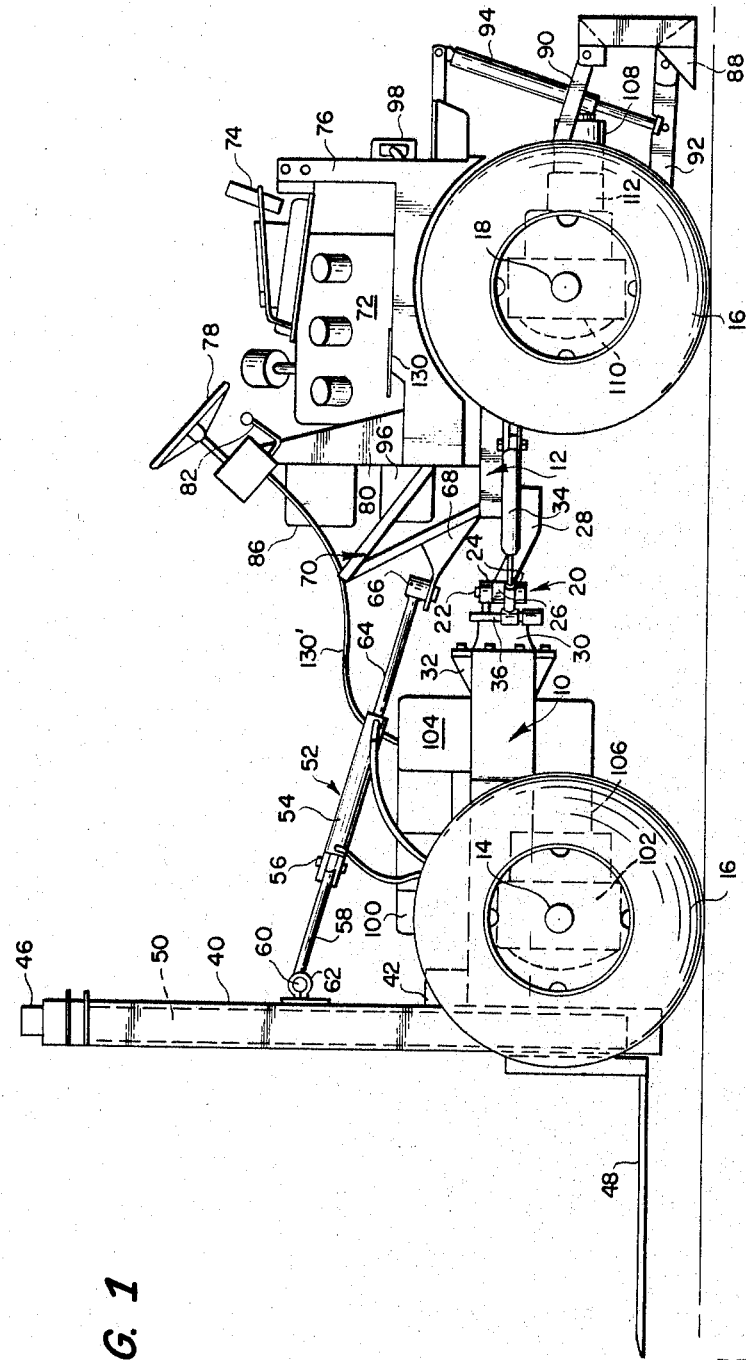
FIGURE 1 is a side elevation view of a vehicle of the invention.
Figure 2:
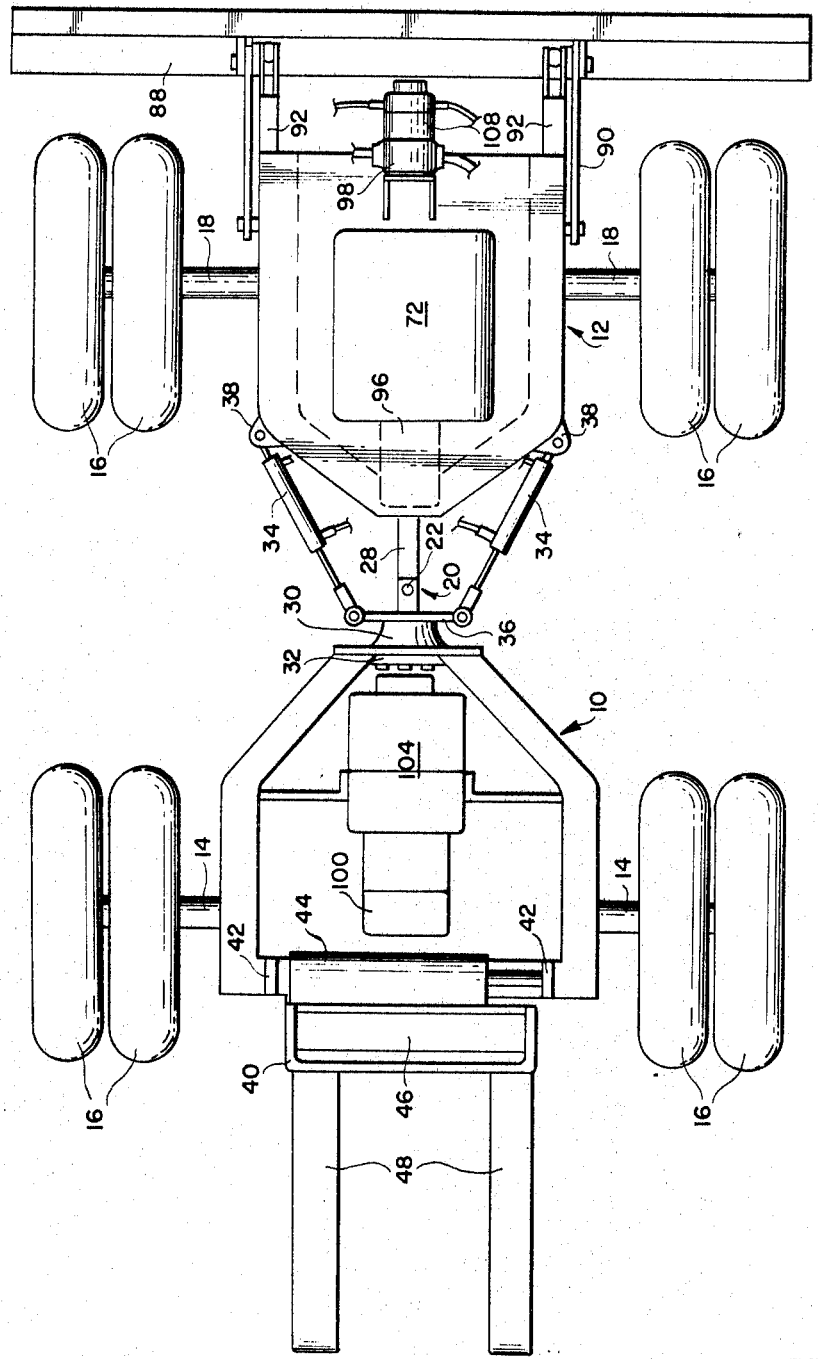
FIGURE 2 is a plan view of the vehicle with certain parts removed for clarity of illustration.

Referring to the drawings, and initially to FIGURES 1 and 2 thereof, a preferred form of vehicle constructed in accordance with the invention comprises a forward frame 10 and a rear frame 12. The forward frame is supported upon a front axle 14, each end of which is provided with a pair of wheels 16, and the rear frame is supported upon a rear axle 18 similarly provided with wheels 16. The frames are generally rectangular but have portions which converge toward a center steering joint 20. As shown in FIGURES 1 and 2, the steering joint may comprise a king pin 22 extending through a pair of fixed spaced sleeves 24 and an intermediate sleeve 26 which turns about the pin. Sleeve 26 is supported upon the end of an arm 28 projecting forwardly from the rear frame 12. Sleeves 24 are supported upon a boss 30 which is turnable in a hub 32 fixed to the forward frame 10. The boss 30 is captive within the hub 32 to prevent longitudinal separation of the frames but provides for rolling movement of one frame relative to the other. Steering movement (yawing) of one frame relative to the other is accomplished by a pair of hydraulic rams 34 which have their piston rods pivotally connected to a plate 36 fixed to the boss 30 and their cylinders pivotally connected to lateral projections 38 (FIGURE 2) on the rear frame.

A fork lift mast 40 is pivotally supported by blocks 42 upon the front of the forward frame for pitching movement relative to the frame. The tilt axis of the mast is in front of and above the front axle 14. The mast mounting comprises a horizontal hydraulic ram 44 (FIGURE 2) which permits the mast to be shifted laterally relative to the forward frame. The fork lift comprises an elevator 46 supporting the forks 48 and actuated by a vertical hydraulic ram 50 through a conventional chain and sprocket drive.

Figure 4:
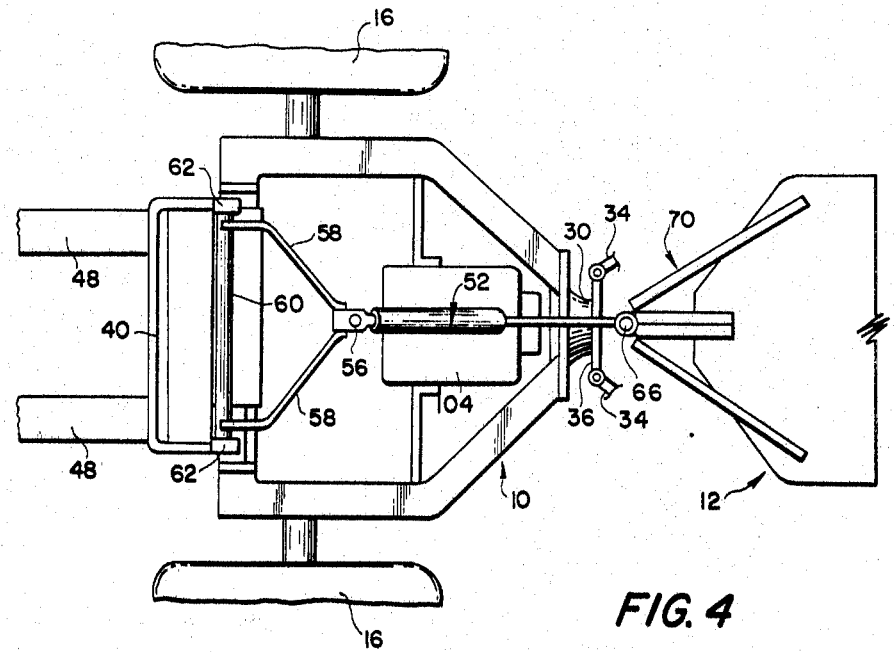
FIGURE 4 is a fragmentary plan view with certain parts removed for clarity of illustration.

Loads supported by the fork lift create a torque about the front axle 14 which tends to move the back of the forward frame upwardly. In accordance with the invention this torque is substantially counterbalanced by connection of the mast 40 to the rear frame 12. A link between the mast and the rear frame is constituted by a hydraulic ram 52, which also serves to tilt the mast. The cylinder 54 of the ram is pivotally connected at one end to the pin 56 supported at the apex of a triangular bracket 58 (FIGURE 4), the base of which is constituted by a rod 60 pivotally supported in sleeves 62 mounted upon the vertical side rails of the mast 40. The piston rod 64 of the ram has its end provided with a socket 66 which receives a ball supported upon a bracket 68. The bracket is fixed to the center leg of a tripod 70 mounted upon the rear frame. The ball and socket joint is aligned vertically with the center steering joint 20 to permit steering without affecting the mast. Rolling movement of one frame relative to the other is accomplished without substantial tilting movement of the mast relative to the forward frame.

The load supported upon the forks 48 tends to tip the mast 40 forwardly, creating an extensile force in the link 52, a component of which applies a torque to the rear frame about the rear axle and tends to move the front of the rear frame downwardly to counterbalance the upward force exerted upon the steering joint by the forward frame. The counter-torque is a function of the height of the connection at 66 to the tripod 70. The optmium height can be determined by applying loads to the forks and observing the resultant movement tendency at the steering jjoint for different heights of temporary connection to the tripod, until balance is achieved. In the embodiment shown the axles are equidistant from the steering joint, and the pivot axis at blocks 42 is located as close to the front axle as conveniently possible. The upward force exerted upon the steering joint by the front frame is substantially counterbalanced, regardless of the load on the forks 48, by the counter-torque applied to the rear frame through link 52. Hence, it is possible to utilize a much smaller and less expensive steering joint than has been possible heretofore and yet to minimize wear.

Figure 3:
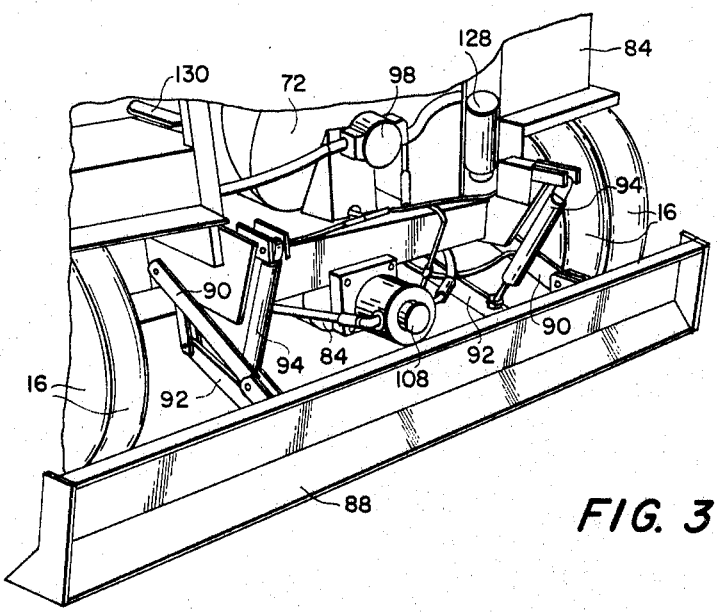
FIGURE 3 is a fragmentary rear perspective view of the vehicle.

An internal combustion engine 72 is supported upon the rear axle 18 substantially equidistant between the rear wheels. At the left side of the engine is a driver's position including a seat 74 cantilevered from a post 76, a steering wheel 78, and a plurality of controls, one of which is shown at 82. Supported at the right side of the engine is a reservoir 84 for hydraulic fluid (FIGURE 3). A gasoline tank is located at 86 in FIGURE 1.

At the back of the vehicle an earth moving blade 88 is mounted upon pairs of links 90 and 92. The links are pivotally supported at one end upon the rear frame 12. and are pivotally connected to the blade to form a modified parallelogram linkage. Hydraulic rams 94 pivotally suspended at opposite sides of the rear frame have their piston rods pivotally connected to the lower links 92 for controlling the height of the blade.

The engine 72 has drive couplings at its opposite ends. The front coupling is connected to a variable displacement main pump 96, while the rear coupling is connected to an auxiliary pump 98. The auxiliary pump provides hydraulic fluid for all of the hydraulic rams, including rams 34 for steering, ram 44 for shifting the mast 40 laterally, ram 50 for actuating the elevator 46, ram 52 for tilting the mast, and rams 94 for moving the blade 88. The auxiliary pump supplies hydraulic fluid to these rams from the fluid reservoir 84 through a series of valves (not shown), including a priority valve, which directs the fluid first to a steering control unit, and a plurality of directional control valves for the rams. The steering control unit is actuated by the steering wheel 78 and may be a conventional Charlyn steering unit (open center), the steering rams 34 being cross-connected so that they move oppositely. All of the rams except the elevator ram 50 are double-acting.

The drive train of the vehicle comprises a front hydraulic motor 100 which drives the pinion of a conventional differential 102 through a gear reduction unit or transmission 104 and a flexible coupling 106, all supported medially upon the forward frame 10. The drive train also comprises a rear hydraulic motor 108 driving the pinion of a conventional rear differential 110 through a flexible coupling 112. The transmission 104 may be adjustable to change the gear reduction ratio, or one of the motors (preferably the rear motor) may be a variable displacement unit.

Figure 5:
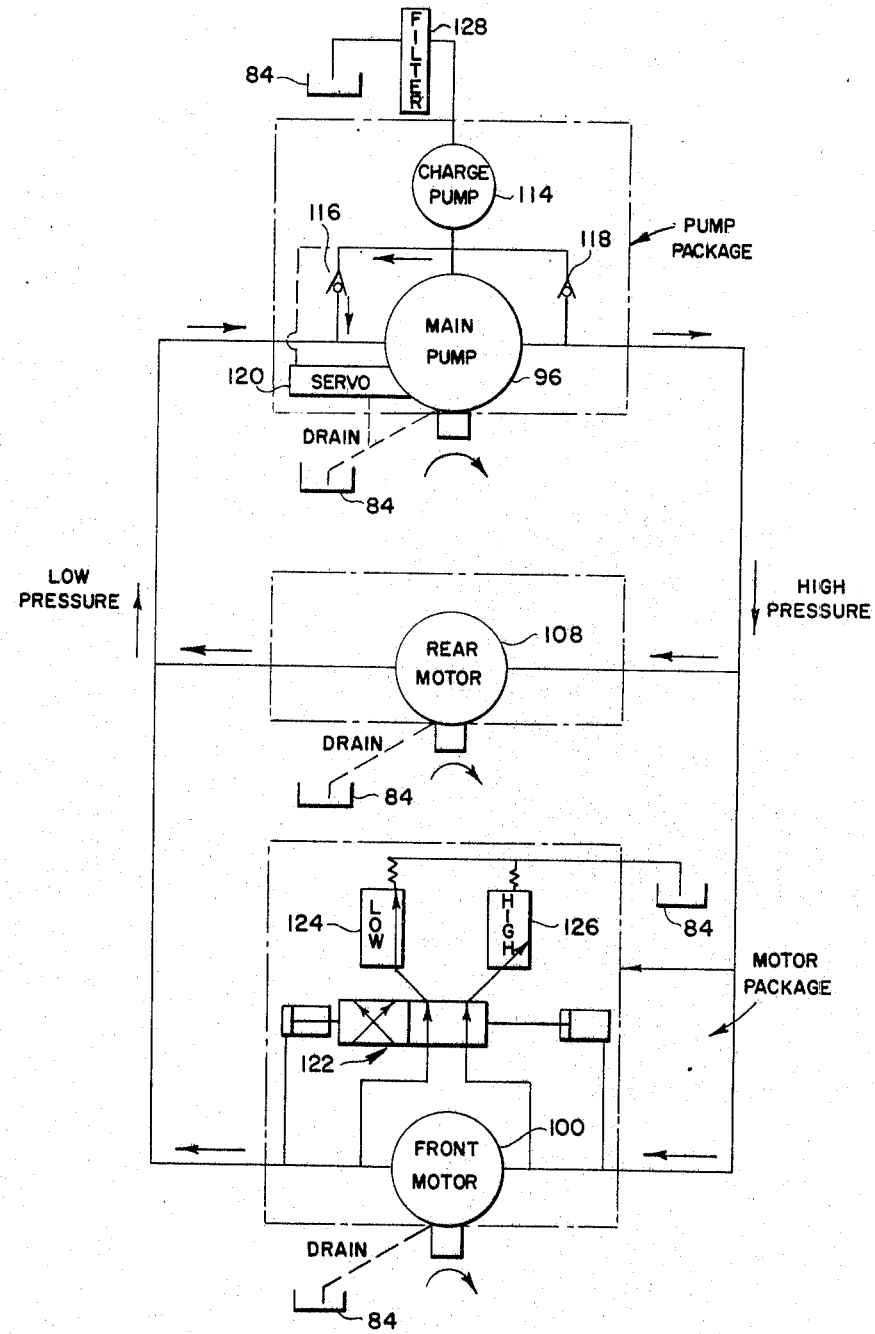
FIGURE 5 is a schematic diagram of the hydraulic drive system of the invention.

The hydraulic circuit for the drive train is illustrated in FIGURE 5, the system being shown in forward drive condition.

The main pump 96 is a variable displacement over-center pump and is part of a pump package which also includes a charge pump 114, check valves 116 and 118, and a servo unit 120. The main pump and the motors 100 and 108 are connected in a substantially closed system (a small amount of hydraulic fluid being supplied by the charge pump 114 through one of the check valves 116, 118).

The main pump is always driven in the same direction, but the direction of fluid flow from the main pump is determined by the operation of the servo 120. One of the motors, e.g., motor 100, is part of a motor package which also includes a flow-reversing shuttle valve 122 actuated by one of its pistons from the high pressure side of the system, so that excess charge pump fluid is continuously drained to the reservoir through a low pressure relief valve 124, a high pressure relief valve (normally closed) being provided at 126. The system also includes a filter 128.

The main pump may be of the type having a plurality of pistons in a rotating block with the stroke of the pistons being determined by the angle of an adjustable cam. The cam angle may be infinitely variable through positive, zero degree (null), and negative angles to determine the stroke of the pistons and the direction of flow. The motors may be similarly constructed, with the cam angle fixed or variable. Such hydraulic components are manufactured by Watertown Division of the New York Air Brake Company, Watertown, N.Y. and are illustrated in their Catalogue DP–10.2.

Operation of the servo 120 may be controlled by a foot pedal 130 (FIGURES 1 and 3) spring biased to a center neutral position and capable of being pressed down forwardly or reversely. In the center position of the foot pedal the servo adjusts the main pump so that no hydraulic fluid is supplied by the main pump although the pump is continuously driven. This position of the pedal is for braking. When the pedal is pressed down forwardly, the servo causes the main pump to supply fluid as shown in FIGURE 5 for driving both motors in a forward direction, the amount of fluid supplied and hence the forward speed being determined by the amount the pedal is depressed. When the pedal is pressed down rearwardly, the servo causes the main pump to reverse the flow direction (closing check valve 116, opening check valve 118, and shifting the shuttle valve 122 to its opposite position) causing the motors to drive in reverse. Again, the speed is a function of the amount the pedal is depressed. Further speed control is obtained by shifting the gear ratio of the transmission or by adjusting the variable displacement motor.

With the drive system of the invention, relatively high speed is provided for movement of the vehicle along roads, yet precise low speed control (with high torque) is also provided. The vehicle can be moved over obstructions the size of a cinder block or larger at very low speeds without stalling or bucking while climbing the obstruction and without acceleration while descending the obstruction. The braking action is very positive and reliable and no additional wheel brakes are necessary. A parking brake may be provided, such as a drum unit on the drive shaft to the front differential and controlled from the driver's station through a cable 130' (FIGURE 1).

When the vehicle is moving down hill, the motors tend to act as pumps and runaway is prevented. When the transmission is shifted to a lower gear, the front motor takes more fluid from the system than the rear motor and operates at higher speed, producing higher torque. This is desirable, because the front wheels are more heavily loaded by the load upon the forks, and the greatest torque is applied at the front wheels to obtain the greatest traction. The components of the vehicle are supported over the respective axles so as to provide balancing of the frames as much as possible, the blade 88 serving as a counterbalance for the rear frame.

While a preferred embodiment of the invention has been shown and described, it will be apparent to those skilled in the art that changes can be made in this embodiment without departing from the principles and spirit of the invention, the scope of which is defined in the appended claims. Accordingly, the foregoing embodiment is to be considered illustrative, rather than restrictive of the invention, and those modifications which come within the meaning and range of equivalents of the claims are to be included therein.

The invention claimed is:

1. A center-steering vehicle comprising a forward frame supported upon a front axle, a rear frame supported upon a rear axle, a steering joint connecting the front of said rear frame to the rear of the forward frame for yawing movement of one frame relative to the other, a mast on said forward frame for supporting a load forwardly of said front axle, whereby a pitching torque is exerted upon said forward frame tending to move the steering joint upwardly, means interconnecting said frames for producing a counter-torque upon said rear frame tending to move said steering joint downwardly in opposition to the first-mentioned torque, said interconnecting means comprising a rigid link connected to said mast at a point above said front axle and connected to said rear frame at a point at which said torque is substantially balanced by said counter-torque, means adjacent to said steering joint for permitting rolling movement of one of said frames relative to the other, said interconnecting means having means, including pivotal couplings adjacent the ends of said link, for accommodating said rolling movement, a front hydraulic motor and a rear hydraulic motor located upon the corresponding frames for driving the corresponding axles, and a variable displacement hydraulic pump supported upon said vehicle for supplying hydraulic fluid to said motors, said motors being connected in parallel to said pump in a hydraulic circuit including supply lines directly extending from said pump to said motors and return lines directly extending from said motors to said pump.

2. The vehicle of claim 1, said mast having an elevator thereon for lifting a load.

3. The vehicle of claim 1, the pivotal coupling adjacent the rearward end of said link being located above and in substantial alignment with the steering joint.

4. The vehicle of claim 1, said rear frame having a material moving blade supported at the back thereof for upward and downward movement and having hydraulic means for moving the same.

5. The vehicle of claim 1, said rear frame having hydraulic ram means for steering said forward frame relative to said rear frame and having a driver's position over said rear axle with control means for said vehicle.

6. The vehicle of claim 1, one of said motors being a variable displacement motor.

7. The vehicle of claim 1, said pump having means for substantially reversing the direction of hydraulic fluid flow to said motors and for substantially interrupting the fluid flow to said motors to provide braking.

8. The vehicle of claim 1, said pump having an engine for driving the same in one direction and having means for selectively reversing the direction of fluid flow to said motors or for substantially terminating the fluid flow to said motors while said pump is driven continually in said direction.

9. The vehicle of claim 1, said pump having control means with a center-normal position at which substantially no hydraulic fluid is supplied to said motors and opposite positions at which fluid is supplied to said motors to drive them forwardly or reversely.

10. The vehicle of claim 1, said mast being pivotally supported on said forward frame for pitching movement relative thereto.

11. The vehicle of claim 10, said link having means for extending it and contracting it for tilting said mast relative to said forward frame.

12. The vehicle of claim 10, said link comprising a hydraulic ram.

13. The vehicle of claim 1, each of said motors being connected to its driven axle by a corresponding differential.

14. The vehicle of claim 13, one of said motors being connected to its differential by gear reduction means.

15. The vehicle of claim 14, said gear reduction means having means for changing the gear ratio.

References Cited

UNITED STATES PATENTS

| 2,279,832 | 4/1942 | Le Tourneau | 187— 9XR |
| 2,421,472 | 6/1947 | Way | 37—117.5 XR |
| 2,827,715 | 3/1958 | Wagner | 37—117.5 |
| 3,007,590 | 11/1961 | Mathew et al. | 214—140 XR |
| 3,049,186 | 8/1962 | Garrett | 37—117.5 XR |
| 3,091,930 | 6/1963 | Thoma et al. | 180—66 XR |
| 3,177,964 | 4/1965 | Anderson | 180—44 XR |
| 3,191,709 | 6/1965 | Symons | 180—51 |
| 3,199,286 | 8/1965 | Anderson | 180—66 XR |
| 3,236,401 | 2/1966 | Wagner | 214—140 XR |
| 3,246,778 | 4/1966 | Kampert et al. | 214—140 XR |
| 3,261,421 | 7/1966 | Forster et al. | 180—66 XR |
| 3,319,936 | 5/1967 | Askins | 180—51 |
| 3,342,282 | 9/1967 | Forpahl | 180—66 XR |

EDGAR S. BURR, Primary Examiner

U.S. Cl. XR.

180—66; 187—9; 214—672, 700